(12) United States Patent
Hay

(10) Patent No.: US 9,567,851 B2
(45) Date of Patent: *Feb. 14, 2017

(54) PIPING COMMUNICATION

(71) Applicant: Halliburton Energy Services, Inc., Houston, TX (US)

(72) Inventor: Richard Thomas Hay, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/053,563

(22) Filed: Feb. 25, 2016

(65) Prior Publication Data

US 2016/0194954 A1   Jul. 7, 2016

Related U.S. Application Data

(63) Continuation of application No. 13/386,625, filed as application No. PCT/US2009/053026 on Aug. 6, 2009, now Pat. No. 9,334,696.

(51) Int. Cl.
| | |
|---|---|
| *E21B 47/16* | (2006.01) |
| *E21B 17/02* | (2006.01) |
| *E21B 47/12* | (2012.01) |
| *G01V 3/30* | (2006.01) |
| *G01V 3/18* | (2006.01) |

(52) U.S. Cl.
CPC ............ *E21B 47/16* (2013.01); *E21B 17/028* (2013.01); *E21B 47/12* (2013.01); *E21B 47/122* (2013.01); *G01V 3/18* (2013.01); *G01V 3/30* (2013.01)

(58) Field of Classification Search
CPC ...... E21B 17/028; E21B 47/12; E21B 47/122; E21B 47/16; G01V 3/18; G01V 3/30
See application file for complete search history.

(56) References Cited

U.S. PATENT DOCUMENTS

| | | |
|---|---|---|
| 3,205,477 A | 9/1965 | Kalbfell et al. |
| 3,660,809 A | 5/1972 | Pearson |
| 5,924,499 A | 7/1999 | Birchak |
| 6,177,882 B1 | 1/2001 | Ringgenberg et al. |
| 6,866,473 B2 | 3/2005 | Otsuka |
| 6,888,473 B1 | 5/2005 | Hall et al. |
| 8,416,098 B2 | 4/2013 | Garcia-osuna et al. |
| 2005/0024231 A1 | 2/2005 | Fincher et al. |

(Continued)

FOREIGN PATENT DOCUMENTS

WO   WO-2011016810 A1   2/2011

OTHER PUBLICATIONS

"U.S. Appl. No. 13/386,625, Notice of allowance mailed Jan. 8, 2016", 12 pgs.

(Continued)

*Primary Examiner* — Benjamin C Lee
*Assistant Examiner* — Rajsheed Black-Childress

(57) ABSTRACT

Apparatus, systems, and methods may operate to communicate, by an information-bearing signal across a mechanical interface, between a pair of electromechanical transducer elements when the pair is compressively loaded. Compressive loading may occur after coupling a male portion of a pipe joint to a female portion of the pipe joint to form the pipe joint. A first one of the pair of electromechanical transducer elements may be included in the male portion, and a second one of the pair may be included in the female portion. Additional apparatus, systems, and methods are disclosed.

20 Claims, 6 Drawing Sheets

(56) References Cited

U.S. PATENT DOCUMENTS

2005/0207279 A1     9/2005   Chemali et al.
2012/0170410 A1     7/2012   Hay

OTHER PUBLICATIONS

"U.S. Appl. No. 13/386,625, Final Office Action mailed Sep. 25, 2015", 18 pgs.
"U.S. Appl. No. 13/386,625, Non Final Office Action mailed Jun. 1, 2015", 19 pgs.
"U.S. Appl. No, 13/386,625, Non Final Office Action mailed Oct. 1, 2014", 16 pgs.
"U.S. Appl. No. 13/386,625, Preliminary Amendment filed Jan. 23, 2012", 9 pgs.
"U.S. Appl. No. 13/386,625, Response filed Jul. 24, 2015 to Final Office Action mailed Jun. 1, 2015", 10 pgs.
"U.S. Appl. No. 13/386,625, Response filed Dec. 31, 2014 to Non Final Office Action mailed Oct. 1, 2014", 10 pgs.
"U.S. Appl. No. 13/386,625, Response filed Nov. 20, 2015 to Final Office Action maiied Sep. 25, 2015", 11 pgs.
"International Application Serial No. PCT/US2009/053026, International Preliminary Report on Patentability mailed May 16, 2012", 9 pgs.
"International Application Serial No. PCT/US2009/053026, Search Report mailed Sep. 29, 2009", 4 pgs.
"International Application Serial No. PCT/US2009/053026, Written Opinion mailed Sep. 29, 2009", 5 pgs.

PIPING COMMUNICATION

RELATED APPLICATIONS

This application is a continuation of U.S. application Ser. No. 13/386,625, filed on Mar. 21, 2012; which application is a U.S. National Stage Filing under 35 U.S.C. 371 from International Application No. PCT/US2009/053026, filed on Aug. 6, 2009, and published as WO 2011/016810 A1 on Feb. 10, 2011; which applications and publication are incorporated herein by reference in their entirety.

BACKGROUND INFORMATION

During petroleum recovery operations, information in the form of commands and data can be communicated from the surface to various locations downhole. Information that characterizes the status of activities and conditions downhole can be communicated in the reverse direction. Telemetry systems that make use of mud pulsing and/or inductive signal transfer have been developed to support such communication.

DETAILED DESCRIPTION

As noted previously, various systems have been developed to implement communications between the surface and downhole devices, and vice versa. Such systems have used mud pulsing, wired connections, and inductive coupling links to facilitate the transfer of data across tool joints. However, due to the limitations imposed by power consumption and propagation distance, the ultimate data transfer rate that can be realized with these technologies is often significantly restricted.

Many of the embodiments described herein make use of an electromechanical device to enable signal transfer across a piping tool joint. More specifically, an electrical information-bearing signal can be converted to a mechanical signal, which is then transmitted across a piping toolface junction, after which the mechanical signal is then converted back into an electrical signal. By constructing a drillstring or other length of piping that embodies this technique, an entire downhole communications network can be created to communicate information in both directions, such as between the surface and any point along the length of the pipe.

Figure 1:
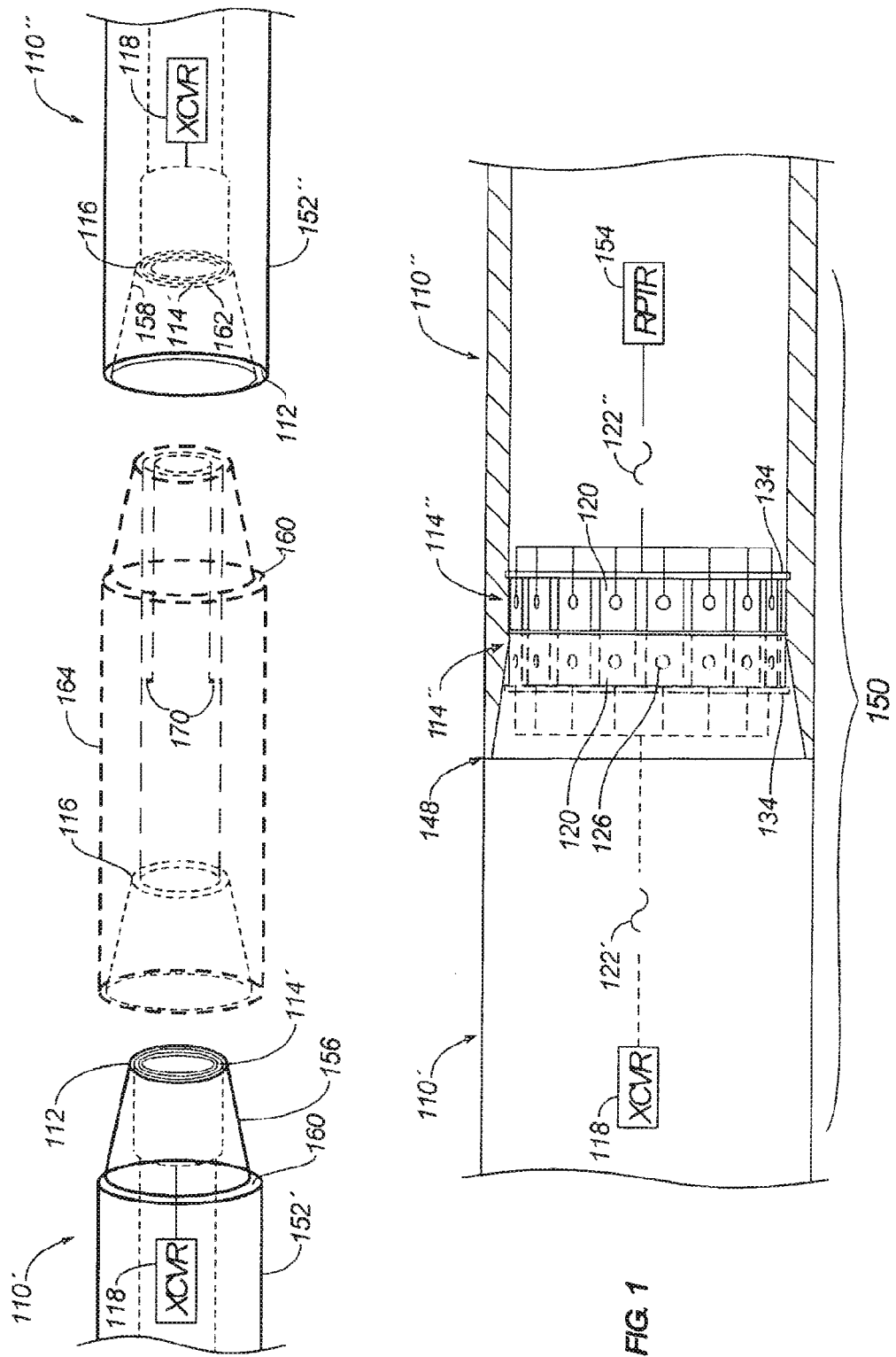
FIG. 1 illustrates apparatus according to various embodiments of the invention.

FIG. 1 illustrates apparatus 110, 150 according to various embodiments of the invention. In its most basic form, an apparatus 110 comprises a pipe 152' having a male portion 156 (in apparatus 110') or a pipe 152" having a female portion 158 (in apparatus 110") and an electromechanical transducer element 114 attached to the male portion 156 or the female portion 158 to communicate an information-bearing signal 122', 122" (e.g., a modulated signal) via e.g., compressive loading. The signal 122', 122" may or may not include a carrier wave.

Mechanical coupling may occur when the two apparatus 110', 110" are coupled directly together (e.g., via threaded connection) to produce an apparatus similar to or equivalent to apparatus 150. Thus, a pair of transducer elements 114" may be directly coupled, so that the mechanical interface comprises direct coupling between the pair of electromechanical transducer elements 114".

In some embodiments, an intermediate pipe 164 is directly coupled to each one of the apparatus 110' and 110", resulting in the indirect coupling of the two apparatus 110', 110" to each other. Thus, one or more pairs of transducer elements 114' may be indirectly coupled, perhaps using one or more pieces of intermediate pipe 164. In this case, the mechanical interface comprises at least one intermediate pipe 164 directly coupled to one or both of a pair of electromechanical transducer elements 114'.

Communication using linear expansion/contraction via mechanical coupling at the tool joint 148 that is suited to the geometry of the structure may provide a useful result in many applications. This is shown most clearly in the apparatus 150, where (in this example) the individual piezoelectric devices 120 that make up a pair of electromechanical transducer elements 114" are axially aligned across the tool joint 148. The electrical input/output in this application would be on the Z-plane of the crystal (e.g., the table of a quartz crystal). The useful bandwidth of this configuration may be much greater than more conventional methods of communicating across pipe joints.

As shown in FIG. 1, the male portion 156 of the apparatus 110' comprises a pin coupler end with a first non-intermediate, mating shoulder 160. The female portion 158 of the apparatus 110" comprises a box coupler end, that includes a second, non-intermediate mating shoulder 162 that abuts the end of the male portion 156 during tool joint make-up, creating a compressive load on the pin and box couplers.

Other coupling configurations and mechanisms may be used. However, in each case, it may be useful to have substantially non-compliant contact between the electromechanical transducer elements 114 across the tool joint 148 contact interface. This may increase the amount of energy transferred from one element 114 to the other, across the joint 148. Thus, several embodiments may be realized.

For example, a first electromechanical transducer element 114' in the male portion 156 forming part of the apparatus 110' can be used to communicate an information-bearing signal 122 to a second electromechanical transducer element 114' in the female portion 158 forming part of the apparatus 110" when the second electromechanical transducer element 114' is mechanically coupled to the first electromechanical transducer element 114'.

The electromechanical transducers 114 may comprise piezoelectric elements, including quartz elements and/or ceramic elements, among others. Thus, in the apparatus 110, 150, the electromechanical transducer elements 114 may comprise one or more piezoelectric elements, as well as an electrical driver 118 (e.g., a transceiver comprising a transmitter and receiver) to provide electrical drive including an information-bearing signal 122 to the piezoelectric element(s).

An alternative to using an electric potential across a piezoelectric device includes the use of a magnetorestrictor (e.g., Terfenol-D, an alloy of the formula Tb(0.3) Dy(0.7) Fe(1.9)) to form the elements 114. In such systems a magnetic field is applied across the magnetorestrictor material that expands or contracts according to the polarity of the magnetic field.

Thus, in some embodiments, the electromechanical transducer may comprise one or more magnetorestrictor elements. In this case, in the apparatus 110, 150, the electromechanical transducer elements 114 may comprise one or more magnetorestrictor elements, as well as a magnetic driver 118 (e.g., a transceiver comprising a transmitter and receiver) to provide magnetic drive including an information-bearing signal 122 to the magnetorestrictor elements.

Using two of the devices 120, juxtaposed across a tool joint 148, can operate to create an electromechanical transformer. In this case, the first transducer in the transformer operates to convert electrical energy in the form of e.g., an information-bearing signal 122' into mechanical energy that is transferred across the joint 148, and via the second transducer, is converted from mechanical energy back into electrical energy, in the form of e.g., an information-bearing signal 122". By adjusting the relative sizes of the two coupled devices 120, the voltage output after conversion can be adjusted. For example, the devices 120, which may comprise piezoelectric elements, can be made to vibrate at a resonant frequency determined by the element length. The operating vibration frequency f is subject to the velocity of sound c and the element length L, such that f≈c/4L with resonance of approximately f/2. In some embodiments, the power transfer ratio of signals across the joint 148, such as from the driver 118 to the repeater 154, is about 1:1. More commonly, the ratio can be about 1:0.5, depending on the coupling efficiency.

In some embodiments, the electromechanical transducer elements 114 may comprise a piezoceramic ring or tube, such as those available from Physik Instrumente GmbH & Co. of Karlsruhe, Germany (see elements 114' in FIG. 1). These devices are generally made of stacked ceramic lead zirconate titanate (PZT) material. When electromechanical transducer elements 114 in this configuration are energized, the radius of the ring/tube will either expand or contract and the height of the ring will contract or expand, respectively. The net effect is different than what is achieved using a group of individually-coupled element pairs oriented in a substantially circular arrangement (e.g., via elements 114"), as the entire mass of the element (e.g., element 114') cooperates to provide mechanical force as a single, larger component. Such devices are well-suited to operation at high temperatures.

Figure 2:
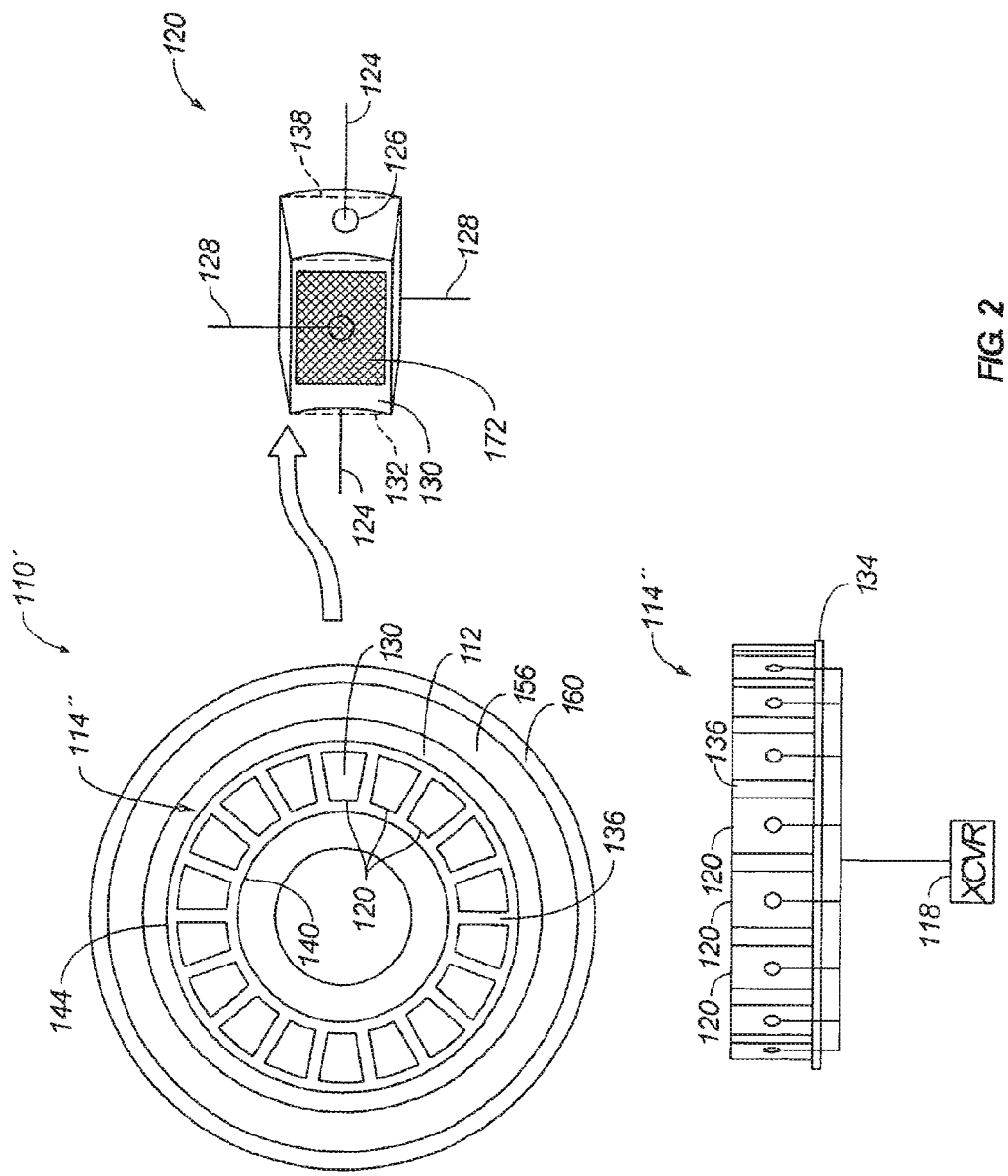
FIG. 2 illustrates electromechanical transducer element configurations according to various embodiments of the invention.

FIG. 2 illustrates electromechanical transducer element 114 configurations according to various embodiments of the invention. In this case, one possible configuration of an electromechanical transducer element 114 is shown in both atop and side view. In addition, a single device 120 comprising a piezoelectric element with possible electrical connections is shown.

Referring now to EEGs. 1 and 2, it can be seen that the electromechanical transducer element 114 may be formed as a single ring element (114'), or as a series of e.g., symmetrical elements (114"). Thus, the electromechanical transducer element 114 may comprise one or more of an integral ring (114') or a series of substantially symmetrical devices 120 (making up the element 114"). The substantially symmetrical devices 120 may be arranged around the periphery of the pipe. Thus, the series of substantially symmetrical devices 120 may be arranged in a substantially circular fashion, and each one of the series may comprise a three-dimensional section, such as a substantially rectangular section (in accordance with flattened facial elements 132), a substantially prismatic section, or a section of a sphere (in accordance with curved facial elements 138). The section taken from a sphere may be truncated, so that the loaded face 130 is substantially planar, for example.

It may be useful to include a compliant interleave material 136, such as rubber, around some portion of each device 120. For example, a lower durometer material 136 may be located between, below (adjacent the inside diameter 140), and above (adjacent the outside diameter 144 of) the devices 120 forming element 114" to allow easier expansion and contraction of the joint 148, while a higher durometer material 134 may be located behind each device 120 to provide a higher coupling force with respect to the tolerances involved (see also FIG. 3). Small grooves (not shown) in the inside diameter 140 and outside diameter 144 of the element 114" assembly could be put in place to aid in pressure balancing the material 136, as well as providing for expansion during temperature changes, while still maintaining a relatively stiff coupling on the ends 112 of each pipe 152.

In addition to, or in lieu of the compliant material 134, springs (see elements 348 in FIG. 3) on the back of each device 120 in the element 114, and perhaps a metal jacket 172 protecting the front face 130 of each device 120 in the element 114, could be used to provide additional environmental and physical dimension tolerance for the elements 114 when the joint 148 is made up. This would include increasing the ability to handle pipe dope and other such thread compounds that might reduce the ability to communicate signals 122 across the joint 148.

Thus, a compliant interleave material 134, 136 may be used to surround, perhaps completely, the electromechanical transducer elements 114, including individual component devices 120 that serve to form the element 114. A "compliant" interleave material 134, 136 has a Young's modulus that is less than the Young's modulus associated with each of the electromechanical transducer devices 120 in the elements 114 which it separates. Therefore, one or more of the devices 120 in a series of devices 120 may be separated by a compliant interleave material 134, 136.

A number of materials can be used to protect and suspend the transducer elements, including polymers. A polymer used in this manner may comprise an elastomer, such as an elastic hydrocarbon polymer (e.g., rubber), polyvinylidene fluoride (PVDF), or polytetrafluoroethylene (e.g., Teflon® material), among many others. Thus, the apparatus 110, 150 may comprise a polymer in which the electromechanical transducer 114 is at least partially embedded.

In some embodiments, metal may be used to shield transducer elements 114 from wear or protect them from breakage. Thus, the apparatus 110, 150 may comprise a metallic jacket 172 to surround at least a portion of at least one of the pair of electromechanical transducer elements 114. Thus, as seen in FIG. 3, the jacket 172 may be applied to the faces of two opposing devices 120, or to only one face of two opposing devices 120.

Returning now to FIGS. 1 and 2, it can be seen that the transducers 114 may be located on a shoulder 160, 162, 170 of the pipe 152, 164. The term "intermediate shoulder" applies to shoulder 170, which is a shoulder on a pipe that lies between two other shoulders (e.g., shoulders 160, 162), which are "non-intermediate" shoulders. A "stop shoulder" includes shoulders 160, 162, which operate to provide a positive stop to movement between pipes 152. An "outside shoulder" (e.g., shoulder 160) is located on the exterior of the pipe, and an "inside shoulder" (e.g., shoulders 162, 170) are located on the interior of the pipe. Titus, in some embodiments, the electromechanical transducer 114 is attached to a non-intermediate, inner shoulder 162 of the pipe 152".

As noted previously, the pipe coupling mechanism may comprise any number of types, including tongue and groove, angled-key, and box-to-pin coupling (shown in FIG. 1). Thus, the male portion 156 may comprises a pin end of the pipe 152', and the female portion 158 may comprise a box end of the pipe 152".

Figure 3:
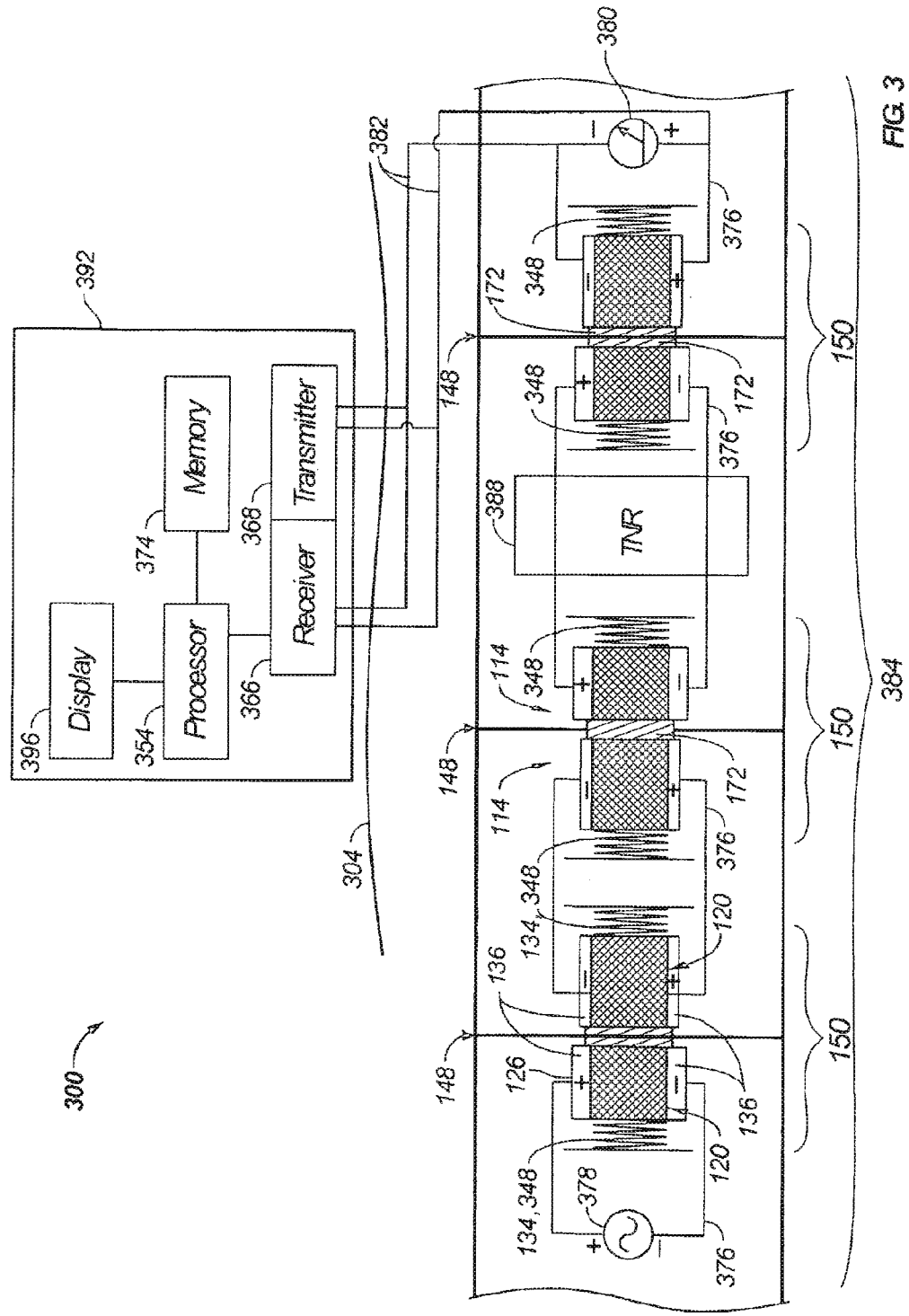
FIG. 3 illustrates systems according to various embodiments of the invention.

When the elements 114 are mated by coupling the pipes 152 together, the faces 130 of the elements contact each other first, to begin the pre-loading process, compressing the elements 114, the compliant material 136, and/or the springs 348 (see FIG. 3). Upon a sufficient pre-load force being reached, the pin shoulder 160 of the connection contacts the end 112 of the box, limiting and controlling the applied pre-load, as well as helping to keep debris out of the area. Similarly, the inside shoulder 162 of the box contacts the end 112 of the pin. Using threads like the Grant Prideco GDPS50 for a 6¾" tool diameter (or a similar double-shouldered connection) would be suitable for this purpose.

The compliant material 136 may experience shearing forces during joint make up from twisting together of the pipes 152 during make up. If lubricants don't reduce the shear forces to acceptable levels, a bearing may be built into one or both of the shoulders 160, 162, or the ends 112. The joint 148 may also include one or more keys to control pre-loading during make up.

Electrodes can be attached in line with the diameter of the pipe, or in line with its longitudinal axis. Thus, the apparatus 110 may comprise electrodes 124 attached to an inner diameter and an outer diameter of the electromechanical transducer (e.g., to device 120). In some embodiments, the electrodes 128 may be attached to an exterior face 130 and an interior face of the electromechanical transducer (e.g., to device 120). In some embodiments, each of the devices 120 in the elements 114 is fed substantially the same signal at substantially the same time in substantially the same phase, so as to provide a more uniform mechanical behavior, and consistent levels of mechanical power transmission.

The apparatus 150 may also take the form of a pipe joint 148 having a pair of elements. In this case, the apparatus 150 comprises a pipe joint 148 having a male portion 156 and a female portion 158. The apparatus 150 further comprises a pair of electromechanical transducer elements 114' to communicate an information-bearing signal 122 across the mechanical interface between the pair when the pair is compressively loaded by coupling the male portion 156 to the female portion 158. One of the pair of elements 114" is included in the male portion 156, and one of the pair of elements 114" is included in the female portion 158.

As noted above, one or more repeaters may be included in the apparatus 150. Thus, the apparatus 150 may comprise an electrical signal repeater 154 to receive and transmit the information-bearing signal 122.

The transducer elements 114 and individual devices 120 of the transducers can be formed from many materials, some of which may be better suited to particular applications than others. For example, quartz is a material that provides roughly 140 Megapascals (Mpa) of compressive loading capability. It can be cut in curved keystone type patterns (e.g., see FIG. 2) and assembled to make a ring of devices. Electrodes 124 or 128 can be attached to each of the devices. However, in some cases, quartz devices may not expand/contract to the same extent as a stacked ceramic element, so that larger pre-load forces are needed, and possibly higher drive voltages for satisfactory signal transfer across the joint 148.

Ceramic materials may use a lower pre-load force, but may have less physical robustness in the face of mishandling. Ceramics may also be more prone to thermal cracking, and less resilient to downhole pressures.

Polymers can be used as devices 120 in some embodiments. In this case, polymers can be formed that have high mechanical output with piezoelectric properties. These pure thermoplastic fluoropolymers, including polyvinylidene fluoride (PVDF) material, can be molded into a variety of shapes. Such materials are available from Ktech Corporation of Albuquerque, N. Mex., among others. Thin film piezoelectric device made from these materials can be stacked into many layers to provider increased coupling efficiency with lower amounts of compressive loading.

FIG. 3 illustrates systems 300 according to various embodiments of the invention. To provide a mechanism for communicating via drillpipe in a downhole environment, as well as along piping used in other environments, the various embodiments make use of compressively-loaded electromechanical transducer elements 114 installed in both sides of a tool joint 148. The elements 114 are sometimes aligned so that mechanical contact between each element 114 occurs. In principle, electrical energy is converted into mechanical energy across the tool joint 148, and then converted back into electrical energy after the energy has traversed the joint 148.

In some embodiments, an electrical signal transmission source 378 may be used to drive one or more of the elements 114. The source 378 may comprise a high voltage, low current output source since relatively little current actually leaks across the element 114. By electrically stressing an element 114 on one side of the joint 148, an opposite reaction occurs in the complementary element 114 on the other side of the joint 148. The resulting signal can be carried over a conductive element 376, such as a wire or the pipe itself, where the operation repeats at each tool joint 148 for as many joints 148 as desired until the resulting signal reaches a receiver 380. Communication of the signal can be unidirectional, or bi-directional.

As the signal propagates across multiple joints, attenuation may occur due to various losses. Thus, the magnitude of mechanical deflection and corresponding electrical energy received may diminish as the propagation distance increases. Repeaters (see repeater 154 of FIG. 1) can be employed to boost the signal as desired.

Referring to FIGS. 1-3, it can be seen that transmission of the information-bearing signal 122 across the tool joint 148 may occur as follows. Starting with the top junction 126, a positive electric potential is applied across the polarized Z axis of the device 120 (e.g., a piezoelectric crystal element). In this example, the applied potential causes the device 120 to deform and grow wider while it's length shortens. A mechanical biasing force may be provided by compliant material 134 and/or springs 348 to add mechanical coupling between the sets of devices 120 that form part of the apparatus 150. As a first device 120 in the set contracts, the second device 120 in the set lengthens, aided by the material 134 and/or bias springs 348, creating an opposite charge across the contacts of the second device.

When the input signal generated by the source 378 on the energized piezoelectric device 120 returns back to a neutral value (e.g., approximately zero volts), the two elements 114 (each having one or more devices 120) making up part of the apparatus 150 are in equilibrium, and in general may return to their original, unexcited condition, perhaps having substantially the same shape. When the polarity of the first (energized) device 120 becomes negative, it lengthens, causing the second (un-energized) device 120 to contract in length, again creating an opposite polarity across its electrical output terminals.

The excitation polarity may then return to zero, creating acyclic movement and ultimately, transmission of the information-bearing signal 122 across the tool joint 148. It is also possible to use half-wave excitation, resulting in contraction-only or expansion-only and return-to-zero communication.

The system 300 can be used with other strings of piping, besides drillstrings. For example, the system 300 may include production tubing, multilateral junctions, casing, liner, drillable casing, drillable liner and other piping networks.

The piping network 384 that includes one or more apparatus 150 comprising a series of downhole joints 148 may be characterized by a variance in the coupling force for each joint 148, leading to a variation in coupling efficiency. In use, each joint 148 may behave like a mechanical low pass filter, rolling off higher frequencies as the coupling efficiency is reduced. However, it can be noted that the network as a whole has a communication spectral bandwidth that extends from almost zero hertz to an upper half-power point of almost one megahertz. The limiting factor on the low end is primarily controlled by leakage current of the elements 114. High frequency losses may be governed by the capacitance and inductance of the system 300, which also acts like a low pass filter.

In some embodiments, the conductive element 376 may comprise coaxial cable. Twisted pair and a single wire using the pipe itself as a second conductor may also be used.

The information-bearing signal 122 may comprise one or more modulation schemes to communication information across the tool joint 148. For example, the signal 122 may comprise amplitude modulation or frequency modulation in some embodiments.

A carrier wave frequency approximately equal to the natural frequency of the elements 114, or to the natural resonance frequency of the overall coupled (assembled) system 300 may be used to help achieve a higher Q factor for a given coupling pre-load force at each joint 148. In some embodiments, the individual element 114 resonance frequency and the overall system 300 coupling resonance frequency may be substantially the same.

Matching the system 300 carrier wave frequency to the coupling resonance frequency can be achieved by conducting a frequency sweep over an interval of assembled piping to determine the frequency at which substantially maximum signal strength is obtained. This can be accomplished automatically, on a periodic basis as pressure and/or temperature changes occur to find a carrier wave frequency that works well over a variety of conditions. In this way, and adaptive version of the system 300 that includes an automatic tuning module 388 can take advantage of the current system 300 resonance frequencies and harmonics over a wide range of operating conditions. Such an automatic system could make use of a feedback signal that indicates propagation conditions or quality, as is known to those of ordinary skill in the art.

Using a carrier wave frequency adjusted to match the resonance of a piping segment means that the overall pass band of the resonance is smaller than the overall baseband available. However, this type of operation may also take less energy to drive a desired signal through a given length of piping within the system 300. Multiple pass bands may exist depending on the coupling properties.

The network 384 may be operated using a driver 118 installed in a sub screwed on the top drive or kelly pipe of a drillstring. The signal at the surface 304 could be connected through various mechanisms to the sub. In some embodiments, the connection 382 may comprise a wireless connection, or an electrical (wired) swivel. In others, the connection 382 may comprise a mechanical one that uses a stress wave signal to communicate between the rotating and non-rotating components on the drill floor. Thus, many embodiments may be realized.

For example, a system 300 may comprise a receiver 366 and transmitter 368 to communicate the information-bearing signal 122 over the network 384. A processor 354 may be used to execute instructions stored in a memory 374 to accomplish such communication. A display 396, perhaps forming part of a surface workstation 392 in the system 300 may be used to display the information-bearing signal 122, or data included in the information-bearing signal 122. The system 300 may comprise a downhole tool that includes any one or more components of the system 300.

Figure 4:
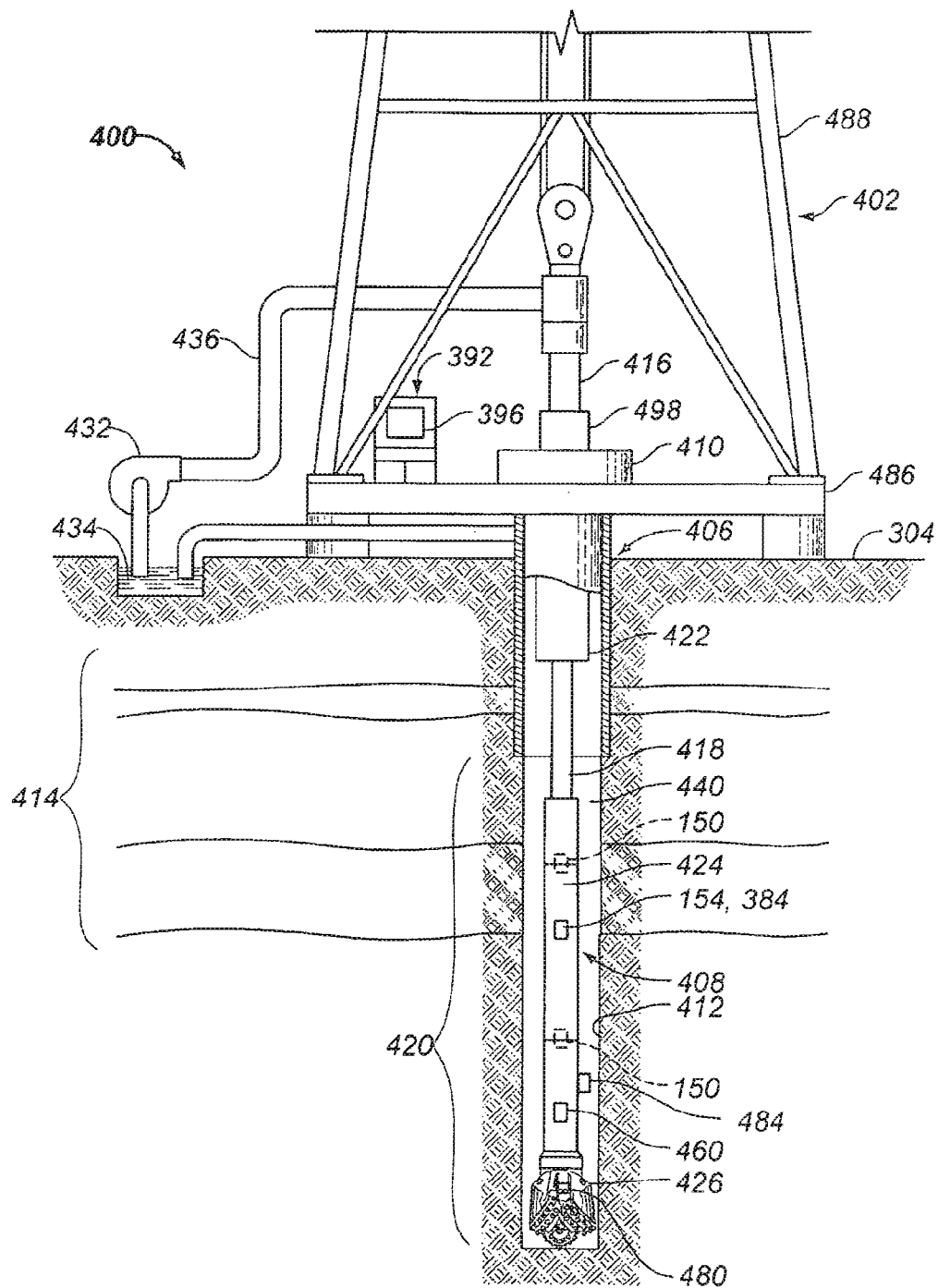
FIG. 4 illustrates additional systems according to various embodiments of the invention.

FIG. 4 illustrates additional systems 400 according to various embodiments of the invention. The system 400 may comprise more than one of the apparatus 110, 150, as well as one or more systems 300. Thus, the apparatus 110, 150 and system 300 as described above and shown in FIGS. 1-3 may form portions of a down hole tool 424 as part of a downhole drilling operation.

Turning now to FIG. 4, it can be seen how a system 400 may also form a portion of a drilling rig 402 located at the surface 304 of a well 406. The drilling rig 402, comprising a drilling platform 486 may be equipped with a derrick 488 that supports a drill string 408 lowered through a rotary table 410 into a wellbore or borehole 412.

Thus, the drill string 408 may operate to penetrate a rotary table 410 for drilling the borehole 412 through subsurface formations 414. The drill string 408 may include a Kelly 416, drill pipe 418, and a bottom-hole assembly (BHA) 420, perhaps located at the lower portion of the drill pipe 418. The drill string 408 may include wired and unwired drill pipe, as well as wired and unwired coiled tubing, including segmented drilling pipe, casing, and coiled tubing.

The BHA 420 may include drill collars 422, a down hole tool 424, and a drill bit 426. The drill bit 426 may operate to create a borehole 412 by penetrating the surface 304 and subsurface formations 414. The down hole tool 424 may comprise any of a number of different types of tools including measurement while drilling (MWD) tools, logging while drilling (LWD) tools, and others.

During drilling operations, the drill string 408 (perhaps including the Kelly 416, the drill pipe 418, and the BHA 420) may be rotated by the rotary table 410. In addition to, or alternatively, the bottom hole assembly 420 may also be rotated by a top drive or a motor (e.g., a mud motor) that is located down hole. The drill collars 422 may be used to add weight to the drill bit 426. The drill collars 422 also may stiffen the BHA 420 to allow the BHA 420 to transfer the added weight to the drill bit 426, and in turn, assist the drill bit 426 in penetrating the surface 304 and subsurface formations 414.

During drilling operations, a mud pump 432 may pump drilling fluid (sometimes known by those of ordinary skill in the art as "drilling mud" or simply "mud") from a mud pit 434 through a hose 436 into the drill pipe 418 and down to the drill bit 426. The drilling fluid can flow out from the drill bit 426 and be returned to the surface 304 through an annular area 440 between the drill pipe 418 and the sides of the borehole 412. The drilling fluid may then be returned to the mud pit 434, where such fluid is filtered. In some embodiments, the drilling fluid can be used to cool the drill bit 426, as well as to provide lubrication for the drill bit 426 during drilling operations. Additionally, the drilling fluid may be used to remove subsurface formation 414 cuttings created by operating the drill bit 426.

Thus, referring now to FIGS. 1-4, it may be seen that in some embodiments, the system 400 may include a drill collar 422, a drill string 408, and/or a down hole tool 424 to which one or more apparatus 110, 150 are attached. The down hole tool 424 may comprise an LWD tool, or an MWD tool. The drill string 408 may be mechanically coupled to the down hole tool 424. Thus, additional embodiments may be realized.

For example, a system 400 may comprise a downhole tool 424, driver electronics (e.g., driver 118, repeater 154, source 378, and/or transmitter 368), and drill pipe in a drill string 408 coupled to the downhole tool 424. The drill pipe may comprise one or more pipe joints 148 as described previously, where at least some of the joints 148 have a male portion 156, a female portion 158, and a pair of electromechanical transducer elements 114 embedded within or otherwise attached to the portions 156, 158 to communicate an information-bearing signal 122 provided by the driver electronics across a mechanical interface between the pair of electromechanical transducer elements 114.

In some embodiments, the system 400 may include automatic tuning of the propagating information-bearing signal 122 to decrease the signal attenuation under a wide variety of propagation conditions. Thus, the system 400 may comprise an automatic tuner 388 to adjust the frequency of the information-bearing signal 122 to provide an increased amplitude by attempting to match a resonance frequency of the electromechanical transducer elements 114 or the resonance frequency of the coupling system (e.g., network 384) comprising at least one pipe joint 148. The tuner 384 may be located downhole, as shown in FIG. 4, or above the surface 304.

In some embodiments, the system 400 may include instrumentation 480 in the drill bit 426, with communication occurring between the instrumentation 480 and other components located in the down hole tool 424 or forming some other part of the system 400. This communication may be conducted using mechanical joints comprising one or more of the apparatus 100, 150, as described previously, where the joints are disposed between the bit 426 and the drill string 408, or between the bit 426 and assemblies used to couple the drill bit 426 to the BHA 420. For example, either of the apparatus 100, 150 may comprise a drill bit 426 housing instrumentation 480 to generate the information-bearing signal 122, wherein the instrumentation 480 is electrically coupled to one of the electromechanical transducer elements 114', 114" in the apparatus 100, 150, as is the case with the transceiver 118 shown in FIG. 1, or the electrical signal transmission source 378 of FIG. 3.

In some embodiments, the system 400 may be used to conduct communications between a wireline logging tool, where the wireline logging tool serves as the electrical signal transmission source 378 of FIG. 3. Thus, a system 400 may comprise a wireline logging tool 484 to generate the information-bearing signal 122.

In this case, a wireline logging tool 484 may be conveyed inside of the drill pipe 418 to the desired depth down hole, or to the BHA 420. The wireline logging tool 484 may then be secured in place, perhaps extending through the drill pipe 418, or the BHA 420. Once this is accomplished, then the information-bearing signal 122 from the wireline logging tool 484 may be transmitted to the surface, perhaps to a workstation 392, using mechanical joints comprising one or more of the apparatus 100, 150, as described previously.

Information derived from the information-bearing signal 122 may include data characterizing the downhole formations 414, signal 122 propagation conditions, such as absolute or relative signal strength along the drill string 408, as well as other data. Thus, the system 400 may comprise a display 396 to display data derived from the information-bearing signal 122.

The apparatus 110, 150; pipe 152, 164; male portion 156; female portion 158; electromechanical transducer elements 114; signal 122; joint 148; electrical driver 118; devices 120; repeater 154; facial elements 132, 138; face 130; diameters 140, 144; ends 112; material 134, 136; jacket 172; shoulders 160, 162, 170; springs 348; electrodes 124, 128; systems 300, 400; processor 354; receiver 366; transmitter 368; memory 374; conductive element 376; source 378; receiver 380; connection 382; network 384; tuner 388; workstation 392; display 396; drilling rig 402; drill string 408; rotary table 410; Kelly 416; drill pipe 418; BHA 420; drill collars 422; drill bit 426; mud pump 432; instrumentation 480; wireline logging tool 484; drilling platform 486; and derrick 488 may all be characterized as "modules" herein. Such modules may include hardware circuitry, one or more processors and/or memory circuits, software program modules and objects, and firmware, and combinations thereof, as desired by the architect of the apparatus 110, 150 and systems 300, 400 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for borehole drilling and logging operations, and thus, various embodiments are not to be so limited. The illustrations and descriptions of apparatus 110, 150 and systems 300, 400 are intended to provide a general understanding of the structure of various embodiments, and they are not intended to serve as a complete description of all the elements and features of apparatus and systems that might make use of the structures described herein.

Applications that may include the novel apparatus and systems of various embodiments comprise process measurement instruments, personal computers, workstations, and vehicles, among others. Some embodiments include a number of methods.

Figure 5:
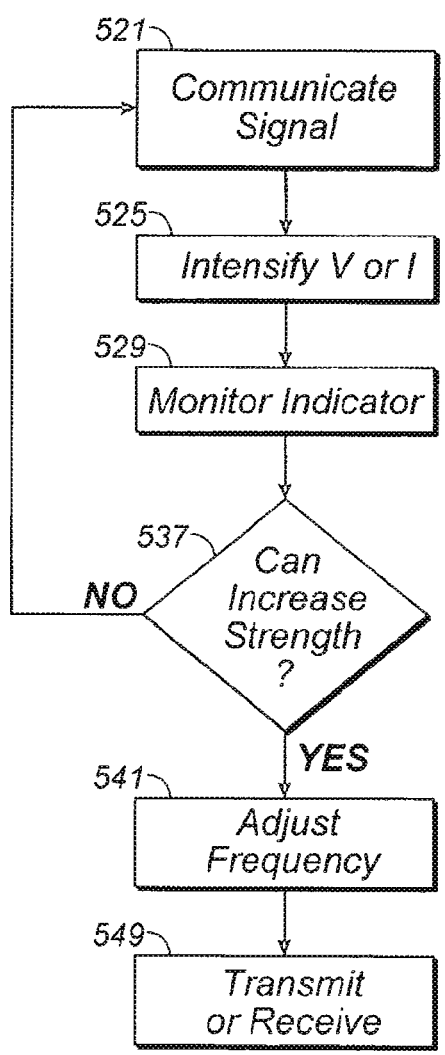
FIG. 5 is a flow chart illustrating several methods according various embodiments of the invention.

For example, FIG. 5 is a flow chart illustrating several methods 511 according to various embodiments of the invention. Thus, a method 511 may begin at block 521 with communicating, by an information-bearing signal, across a mechanical interface between a pair of electromechanical transducer elements when the pair is compressively loaded. Compressive loading may occur after coupling a male portion of a pipe joint to a female portion of the pipe joint to form the pipe joint, wherein a first one of the electromechanical transducer element pair is included in the male portion, and a second one of the pair is included in the female portion.

Communication may be unidirectional (simplex), or bi-directional (half duplex or full duplex), or a combination of the two, where only some of the communicating occurs in a bi-directional fashion. At least some of the communication may comprise transmission or reception of the information-bearing signal as a signal without a carrier wave. Communication may also occur using a return-to-zero, or half-wave conduction method. Thus, in some embodiments, some of the communicating occurs via half-wave conduction.

Mechanical and/or electrical intensification of the propagated signal may be used to selectively amplify the information-bearing signal. Such embodiments may be useful when the pipe diameter changes along the length of a piping network. For example, sections of pipe closer to the surface may have a larger diameter to carry higher torque loads than sections of pipe that are closer to the drill bit. In some cases, segments of the piping string might have different coupling geometries to select a more suitable pass band for the transmission signal frequency used over that interval. Thus, at block 525, the method 511 may comprise intensifying a voltage or a current representing the information-bearing signal to provide a selectable propagation ratio of the voltage or the current across the mechanical interface. The ratio my be any number of chosen values, including a ratio that is approximately 1:1.

Automatic tuning, described above, can be implemented in a number of ways, including attempting to increase the signal strength of the information being communicated. Thus, the method 511 may comprise monitoring an indicator value associated with signal strength of the information-bearing signal at block 537 and, if an increase in signal strength is determined to be possible (e.g., the past history of signal strength indicates that current signal strength is substantially lower than average, or the transducer elements are not operating near the edge of their useful frequency range, etc.), the method 511 may go on to block 541 to include adjusting a frequency associated with the information-bearing signal to increase the signal strength that is received at some selected point in the piping network, or at a surface signal processing workstation.

The method 511 may go on to include, at block 549, transmission or reception of the information-bearing signal using at least one insulated conductor (e.g., coaxial cable) over an interval of pipe coupled to the pipe joint.

It should be noted that the methods described herein do no have to be executed in the order described. Moreover, various activities described with respect to the methods identified herein can be executed in iterative, serial, or parallel fashion. Information, including parameters, commands, operands, and other data, can be sent and received, and perhaps stored using a variety of tangible media, such as a memory. Any of the activities in these methods may be performed, in part, by a digital electronic system (e.g., a digital computer), an analog electronic system (e.g., an analog control system), or some combination of the two.

Figure 6:
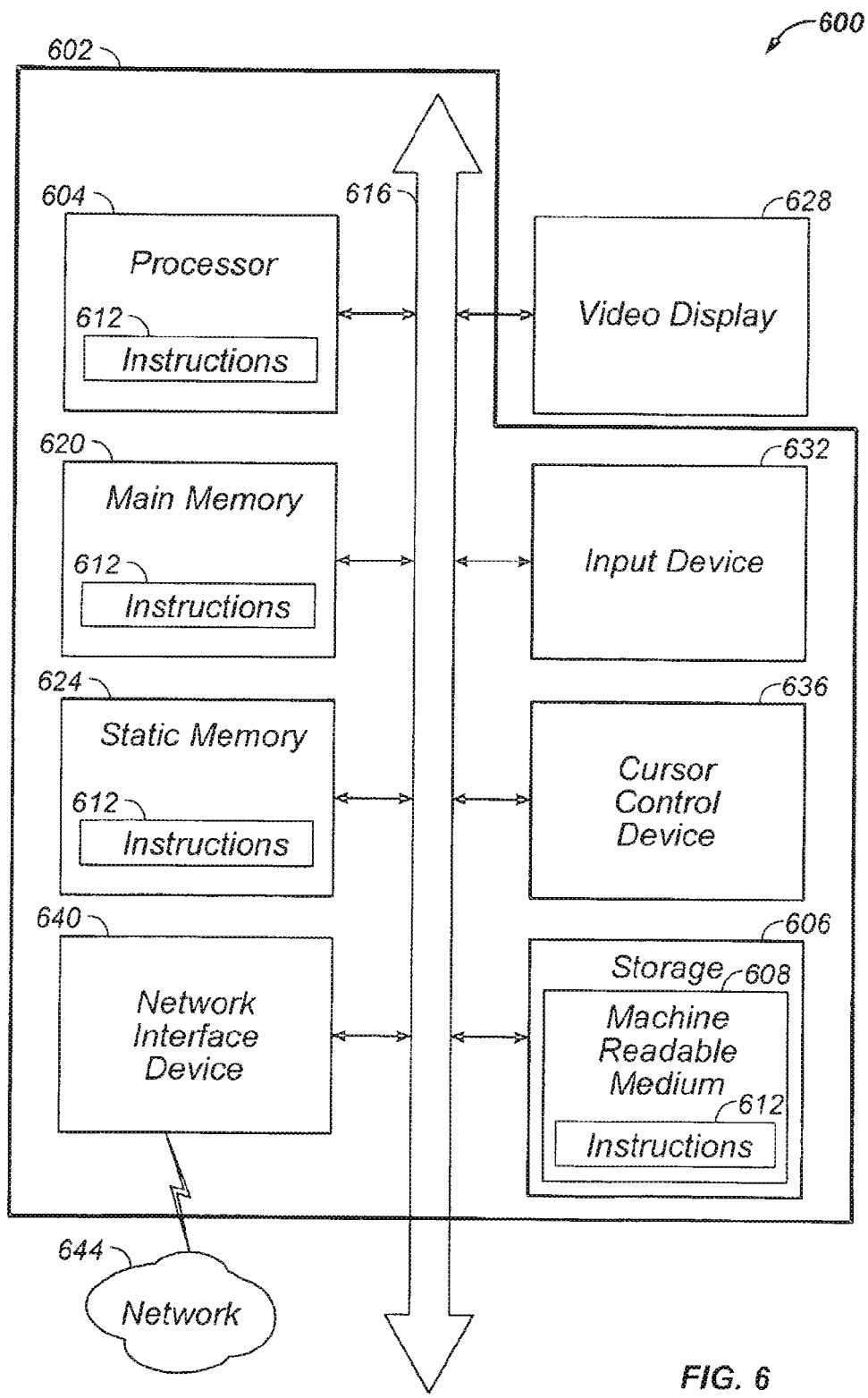
FIG. 6 is a block diagram of an article according to various embodiments of the invention.

FIG. 6 is a block diagram of an article 600 of manufacture, including a specific machine 602, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 600 of manufacture, such as a computer, a memory system, a magnetic or optical disk, some other storage device, and/or any type of electronic device or system may include one or more processors 604 coupled to a machine-readable medium 608 such as a memory (e.g., removable storage media, as well as any memory including an electrical, optical, or electromagnetic conductor comprising tangible media) having instructions 612 stored thereon (e.g., computer program instructions), which when executed by the one or more processors 604 result in the machine 602 performing any of the actions described with respect to the methods above.

The machine 602 may take the form of a specific computer system having a processor 604 coupled to a number of components directly, and/or using a bus 616. Thus, the machine 602 may be similar to or identical to the workstation 392 shown in FIGS. 3 and 4.

Turning now to FIG. 6, it can be seen that the components of the machine 602 may include main memory 620, static or non-volatile memory 624, and mass storage 606. Other components coupled to the processor 604 may include an input device 632, such as a keyboard, or a cursor control device 636, such as a mouse. An output device 628, such as a video display, may be located apart from the machine 602 (as shown), or made as an integral part of the machine 602.

A network interface device 640 to couple the processor 604 and other components to a network 644 may also be coupled to the bus 616. The instructions 612 may be transmitted or received over the network 644 via the network interface device 640 utilizing any one of a number of well-known transfer protocols (e.g., HyperText Transfer Protocol). Any of these elements coupled to the bus 616 may be absent, present singly, or present in plural numbers, depending on the specific embodiment to be realized.

The processor 604, the memories 620, 624, and the storage device 606 may each include instructions 612 which, when executed, cause the machine 602 to perform any one or more of the methods described herein. In some embodiments, the machine 602 operates as a standalone device or may be connected (e.g., networked) to other machines. In a networked environment, the machine 602 may operate in the capacity of a server or a client machine in server-client network environment, or as a peer machine in a peer-to-peer (or distributed) network environment.

The machine 602 may comprise a personal computer (PC), a workstation, a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 602 is illustrated, the term "machine" shall also be taken to include any collection of machines that individually or jointly execute a set (or multiple sets) of instructions to perform any one or more of the methodologies discussed herein.

While the machine-readable medium 608 is shown as a single medium, the term "machine-readable medium" should be taken to include a single medium or multiple media (e.g., a centralized or distributed database, and/or associated caches and servers, and or a variety of storage media, such as the registers of the processor 604, memories 620, 624, and the storage device 606 that store the one or more sets of instructions 612. The term "machine-readable medium" shall also be taken to include any medium that is capable of storing, encoding or carrying a set of instructions for execution by the machine and that cause the machine 602 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods of various embodiments may provide the ability to employ a downhole communications network with the potential for high rate data transfer capabilities. This may result in replacing other, more conventional communication schemes. Some embodiments may permit operation over a wide range of frequencies, perhaps allowing for multiple, simultaneous, bi-directional channels to exist. Such implementations may utilize mechanical coupling at piping joints that is relatively insulated from mechanical vibrations, including those of the drillstring that are proximate to the base band of interest. Auto-tuning of the carrier wave frequency may be used to adjust for a variety of environmental conditions, even to the point of interval-based implementation, where selected intervals of pipe operate on different frequencies for even better isolation and enhanced propagation. Improved drilling efficiency, and lower drilling costs, may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus comprising:
    a set of pipes, each pipe including:
        an end of the pipe to couple to another pipe; and
        an electromechanical transducer element disposed at the end of the pipe, the electromechanical transducer element operable to communicate an information-bearing signal via compressive loading to an electromechanical transducer element disposed on an end of the other pipe with the ends of the pipes mechanically coupled together,
    wherein the information-bearing signal is communicated over a downhole network.

2. The apparatus of claim 1, wherein the apparatus includes an electrical signal transmission source coupled to the electromechanical transducer element that is disposed at the end of the pipe.

3. The apparatus of claim 2, wherein the apparatus includes a receiver to operatively receive the information-bearing signal as an electrical signal.

4. The apparatus of claim 3, wherein the receiver is disposed in a pipe coupled to an end of the set of pipes.

5. The apparatus of claim 4, wherein the set of pipes includes an intermediate pipe between a pipe having the electrical signal transmission source and the pipe having the receiver.

6. The apparatus of claim 5, wherein the intermediate pipe includes a repeater to receive and transmit the information-bearing signal.

7. The apparatus of claim 1, wherein the end of the pipe is a male portion of the pipe structured to operatively couple into the other pipe such the electromechanical transducer elements of the pipe and the other pipe are within the other pipe when the ends of the pipes are mechanically coupled together.

8. The apparatus of claim 1, wherein the electromechanical transducer element that is disposed at the end of the pipe includes a piezoelectric element or a magnetorestrictor element.

9. The apparatus of claim 1, wherein the electromechanical transducer element that is disposed at the end of the pipe includes at least one of an integral ring or a series of substantially symmetrical devices.

10. The apparatus of claim 1, wherein each pipe of the set of pipes includes an additional electromechanical transducer element disposed at an end of the pipe that is opposite to the end of the pipe having the electromechanical transducer element operable to communicate the information-bearing signal.

11. A system comprising:
   an electrical signal transmission source to generate an information-bearing signal;
   an apparatus having a set of pipes, each pipe including:
      an end of the pipe to couple to another pipe; and
      an electromechanical transducer element disposed at the end of the pipe, the electromechanical transducer element operable to communicate the information-bearing signal via compressive loading to an electromechanical transducer element disposed on an end of the other pipe with the ends of the pipes mechanically coupled together; and
   a receiver to receive the information-bearing signal as an electrical signal, the receiver disposed in a pipe coupled to the set of pipes, the pipes of the set of pipes coupled together in series, each pipe separated from a next pipe by a pipe joint,
   wherein the information-bearing signal is communicated over a downhole network.

12. The system of claim 11, wherein each electromechanical transducer element is surrounded by a compliant interleave material.

13. The system of claim 11, wherein each electromechanical transducer element has a front face protected by a metal jacket.

14. The system of claim 11, wherein each electromechanical transducer includes a piezoelectric device coupled to a compliant material and/or a spring to provide a mechanical biasing force.

15. The system of claim 11, wherein a pipe of the set of pipes includes an automatic tuner to adjust a frequency of the information-bearing signal to provide an increased amplitude by an operation to match a resonance frequency of the electromechanical transducer elements or match a resonance frequency of the set of pipes including the associated pipe joints.

16. The system of claim 11, wherein each pipe of the set of pipes includes an additional electromechanical transducer element disposed at an end of the pipe that is opposite to the end of the pipe having the electromechanical transducer element operable to communicate the information-bearing signal, the electromechanical transducer elements in each pipe coupled together by conductive element to transmit the information-bearing signal between the electromechanical transducer element of the pipe.

17. The system of claim 11, wherein the set of pipes is disposed downhole with the receiver operatively coupled to a surface workstation.

18. A method comprising:
   communicating across a set of pipes using an information-bearing signal, each pipe including:
      an end of the pipe to couple to another pipe; and
      an electromechanical transducer element disposed at the end of the pipe, the electromechanical transducer element operating to communicate the information-hearing signal via compressive loading to an electromechanical transducer element disposed on an end of the other pipe with the ends of the pipes mechanically coupled together,
   wherein the information-bearing signal is communicated over a downhole network.

19. The method of claim 18, wherein the method includes intensifying a voltage or a current representing the information-bearing signal to provide a selectable propagation ratio of the voltage or the current across a mechanical interface of a pair of pipes of the set of pipes.

20. The method of claim 18, wherein the method includes:
   monitoring an indicator value associated with signal strength of the information-bearing signal; and
   adjusting a frequency associated with the information-bearing signal to increase the signal strength.

* * * * *

UNITED STATES PATENT AND TRADEMARK OFFICE
CERTIFICATE OF CORRECTION

| | | |
|---|---|---|
| PATENT NO. | : 9,567,851 B2 | Page 1 of 1 |
| APPLICATION NO. | : 15/053563 | |
| DATED | : February 14, 2017 | |
| INVENTOR(S) | : Richard Thomas Hay | |

It is certified that error appears in the above-identified patent and that said Letters Patent is hereby corrected as shown below:

On the Title Page

Related U.S. Application Data currently reads:
"Continuation of application No. 13/386,625, filed as application No. PCT/US2009/053026 on Aug. 6, 2009, now Pat. No. 9,334,696."

Related U.S. Application Data should read as:
--Continuation of application No. 13/386,625 filed on March 21, 2012, now Pat. No. 9,334,696, which is a U.S. National Stage application of PCT/US2009/053026 filed on Aug. 6, 2009.--

In the Specification

In Column 3, Line 52, "atop" should read --a top--;

In Column 3, Line 55, "EEGs" should read --FIGs.--;

In Column 11, Line 24, "my" should read --may--;

In the Claims

In Column 16, Line 21, "hearing" should read --bearing--.

Signed and Sealed this
Thirtieth Day of May, 2017

Michelle K. Lee
*Director of the United States Patent and Trademark Office*